C. B. RICE, Jr., T. BRYAN & C. F. GOODRICH.
RAILWAY SWITCH OPERATING MECHANISM.
APPLICATION FILED NOV. 11, 1909.

983,645.

Patented Feb. 7, 1911.
6 SHEETS—SHEET 1.

C. B. RICE, Jr., T. BRYAN & C. F. GOODRICH.
RAILWAY SWITCH OPERATING MECHANISM.
APPLICATION FILED NOV. 11, 1909.

983,645.

Patented Feb. 7, 1911.
6 SHEETS—SHEET 2.

C. B. RICE, Jr., T. BRYAN & C. F. GOODRICH.
RAILWAY SWITCH OPERATING MECHANISM.
APPLICATION FILED NOV. 11, 1909.

983,645.

Patented Feb. 7, 1911.

UNITED STATES PATENT OFFICE.

CHRISTOPHER B. RICE, JR., AND THOMAS BRYAN, OF PIQUA, OHIO, AND CHARLES F. GOODRICH, OF INDIANAPOLIS, INDIANA, ASSIGNORS OF TWO-FIFTHS TO SAID RICE, JR., ONE-FIFTH TO SAID BRYAN, AND TWO-FIFTHS TO SAID GOODRICH.

RAILWAY-SWITCH-OPERATING MECHANISM.

983,645.   Specification of Letters Patent.   Patented Feb. 7, 1911.

Application filed November 11, 1909. Serial No. 527,543.

*To all whom it may concern:*

Be it known that we, CHRISTOPHER B. RICE, Jr., and THOMAS BRYAN, of Piqua, in the county of Miami and State of Ohio, and CHARLES F. GOODRICH, of Indianapolis, Marion county, Indiana, have invented certain new and useful Improvements in Railway-Switch-Operating Mechanism; and we do hereby declare the following to be a full, clear, and exact description of the invention, such as will enable others skilled in the art to which it appertains to make and use the same.

This invention relates to improvements in railway switch operating mechanism,—the object of the invention being to simplify and improve such mechanism so as to enable the handling of trains and cars quickly, economically and safely either from the side of the track or from a moving train or car from either and both sides of the switch on the main track or from a side track and thus enable the trains or cars to open the switch, take the siding and close the switch after them without stopping the train or car, and also to close any open switch from the main track on either side of the switch (should any be left open) without stopping the train or car or materially slowing down; also by means of a system of signals, to enable the engineer or motorman to know before reaching a switch whether it is open or closed and to open or close it at will, and to know positively before reaching the switch that the same has been opened or closed as occasion may require.

With this object in view the invention consists in certain novel features of construction and combinations of parts as hereinafter set forth and pointed out in the claims.

In the accompanying drawings.

1 represents the rails of the main track; 2 the rails of a siding, and 3 the pivoted switch rails or points.

Figures 16, 17, 18, 19, 20:
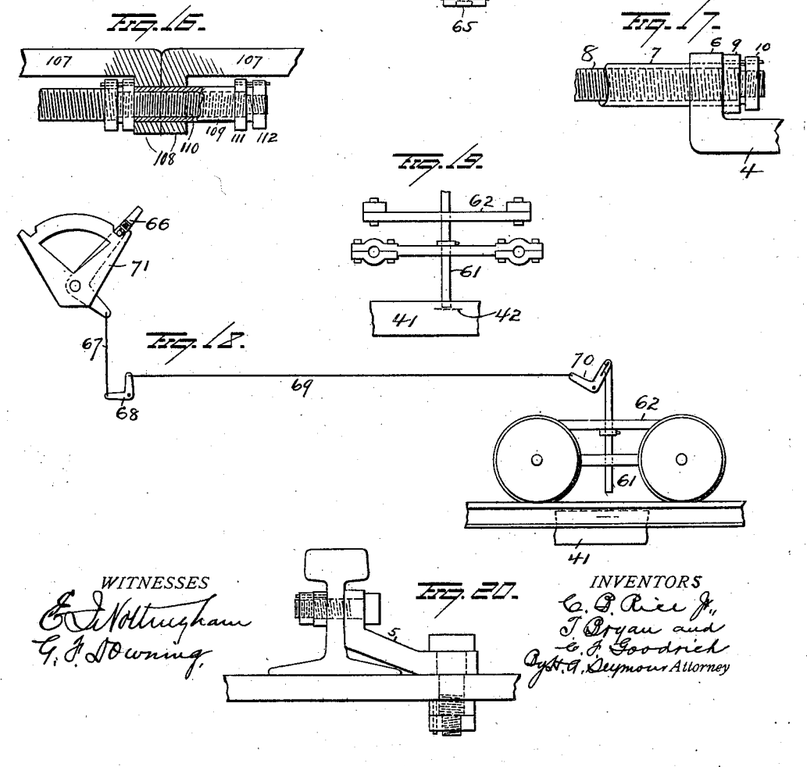

A longitudinally movable bar 4 is disposed transversely under the track rails and is connected to the switch points by means of brackets or arms 5,—one end of each of said arms or brackets being pivotally connected with the bar 4 and the other end secured to the web of the adjacent switch point. One end of the bar 4 is provided with a lateral projection 6 (Fig. 17) having an opening therein for the passage of a sleeve 7 on one end of a rod 8, the free end of the latter being threaded for the reception of nuts 9—10. The other end of the rod 8 is connected by means of a turn-buckle 11 with a bar 12 mounted to reciprocate in a bearing 13. The bar 12 is connected, in a manner presently explained with the operating mechanism, and by providing the movable connection afforded by the sleeve 7, between the bar 12 and the bar 4 the amount of throw of the switch points will be properly regulated and the adjustment of these connections will be further facilitated by the turn-buckle 11.

The bearing 13 above referred to may be located upon a base plate or frame 14 and the latter also supports a vertical shaft 15 on which a wheel 16 is revolubly mounted.

Figure 8:
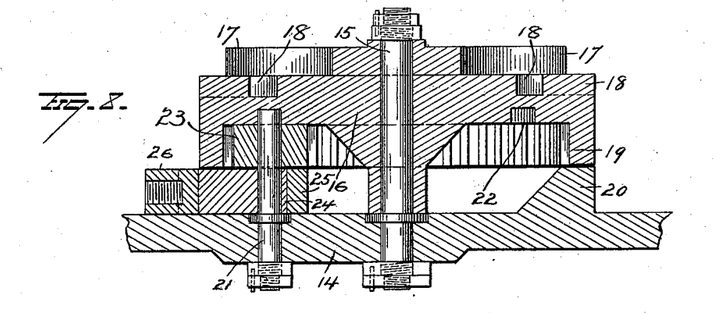
Fig. 8 is an enlarged sectional view illustrating the switch operating devices.
Figure 9:
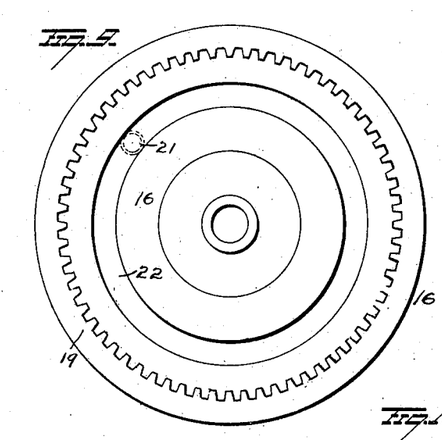
Fig. 9 is a bottom plan view of the wheel shown in Fig. 7.

The wheel 16 is provided upon its top with an annular series of fingers 17 which, in effect constitute a gear with which a series of bell-crank levers coöperate as presently explained. The upper face of the wheel 16 is made with a series of V-shaped grooves 18, the walls of each of which are preferably somewhat curved, and said grooves are so disposed that they will alternate with the fingers 17 but will be in a plane below the latter. The wheel 16 is made with an internally toothed gear 19 which depends from its peripheral portion and sagging of the wheel 16 and consequent strain on the shaft 15 may be avoided by providing the base frame 14 with one or more projections 20 disposed under the internally toothed gear 19 as shown in Fig. 8.

At one side of the vertical shaft 15, a smaller vertical shaft 21 is secured to and rises from the base frame 14 and the upper end of this shaft is loosely disposed in a circular groove 22 in the under face of the wheel 16. The shaft 21 has mounted thereon, a pinion 23 which meshes with the gear 19 of wheel 16. A cam 24 is also mounted on the shaft 21 and is rotatable with the pinion 23. A strap 25 embraces the cam or eccentric 24 and the shank 26 of this strap is connected by means of a short rod 27 with the bar 12,—one end of the rod 27 being threaded to enter the threaded shank 26 of the eccentric strap and the other end of said short rod being pivotally attached to the bar 12. From this construction it will be seen that when the wheel 16 is turned, motion will be imparted by the gear 19 to the pinion 23 and the cam or eccentric 24 and from the latter through the bar 12 and its connections with the pivoted switch rails, motion will be imparted to the latter for moving them to open or to close the switch.

Figures 12, 13, 14, 15:
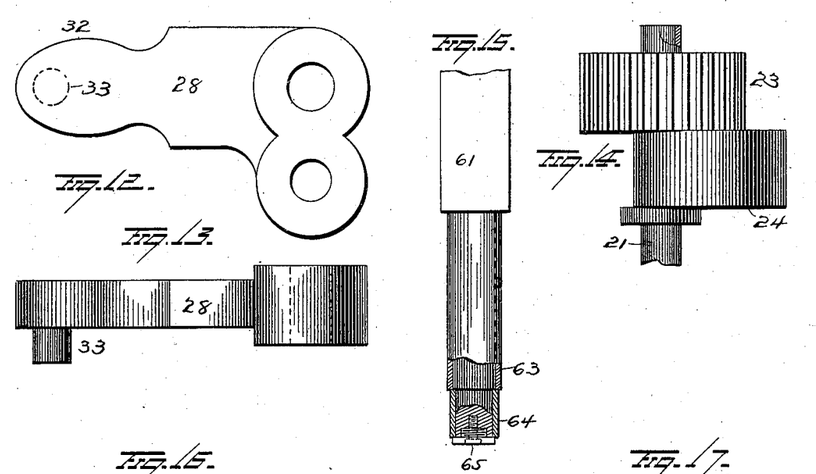
Figs. 12 and 13 are face and side views respectively of one of the bell-cranks by means of which motion is imparted to the wheel shown in Fig. 7.
Fig. 14 is an enlarged detail view showing the connection between the wheel shown in Fig. 7 and the devices connected with the switch rails.
Figs. 15, 16, 17, 18, 19 and 20 are views illustrating details of construction.

A series of bell-crank levers 28, 29, 30 and 31 are mounted on suitable pivot pins 32ª rising from the base frame 14 and disposed around and in proximity to the wheel 16. These bell-cranks are the same in construction and a detailed description of one will suffice for all. The long arm of each of said bell-cranks is made to form a finger 32 as clearly shown in Fig. 12 and from this finger, near its free end, a pin 33 depends as best shown in Fig. 13. With the short arm of each of said bell-cranks a rod is connected and these rods will be operated by the track instrument as hereinafter explained. When one of the bell-cranks is moved on its pivotal support, the pin 33 will enter and move through a portion of one of the V-shaped grooves 18 in the upper face of the wheel 16 and at the same time the finger 32 of said bell-crank will, by engagement with one of the fingers 17 upon the wheel 16, cause said wheel to be turned for transmitting motion in the manner above explained to the pivoted switch rails. When the bell-crank shall have been moved a sufficient distance to cause the pin 33 to have moved to the end of one member of the V-shaped groove, said pin will engage the wall of the other member of said groove and thus stop the movement of the wheel 16,—at which time the finger 32 of the bell-crank will have moved the wheel 16 a sufficient distance to have caused the proper throwing of the switch rails.

Figure 1:
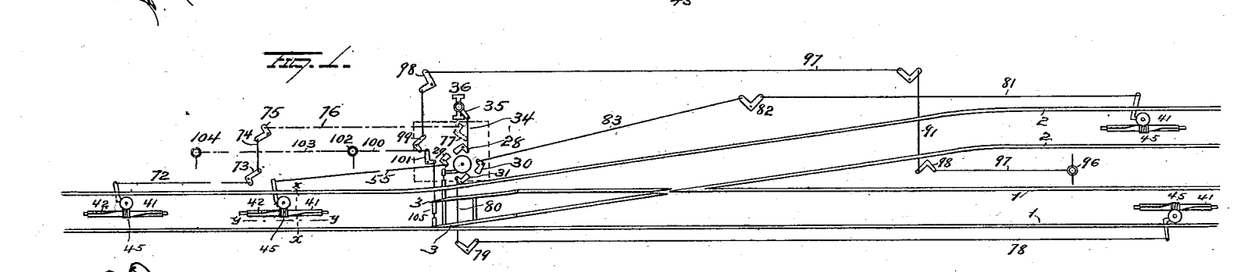
Figure 1 is a diagrammatical view illustrating our improvements.
Figure 2:
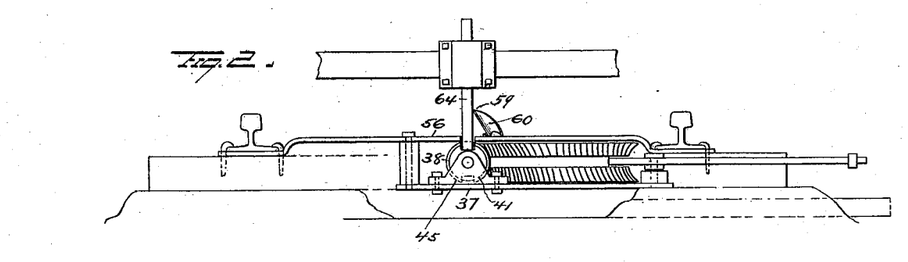
Fig. 2 is a sectional view on the line *x—x* of Fig. 1.
Figure 3:
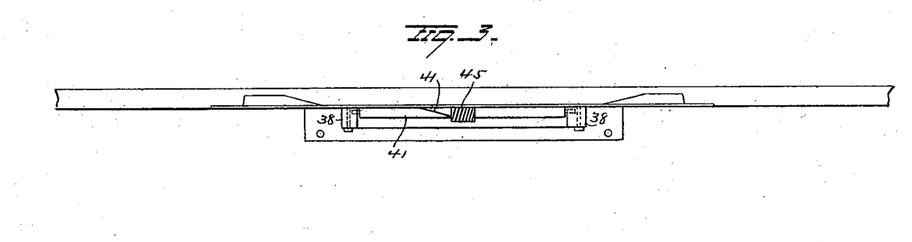
Fig. 3 is a view on the line *y—y* of Fig. 1.
Figure 4:
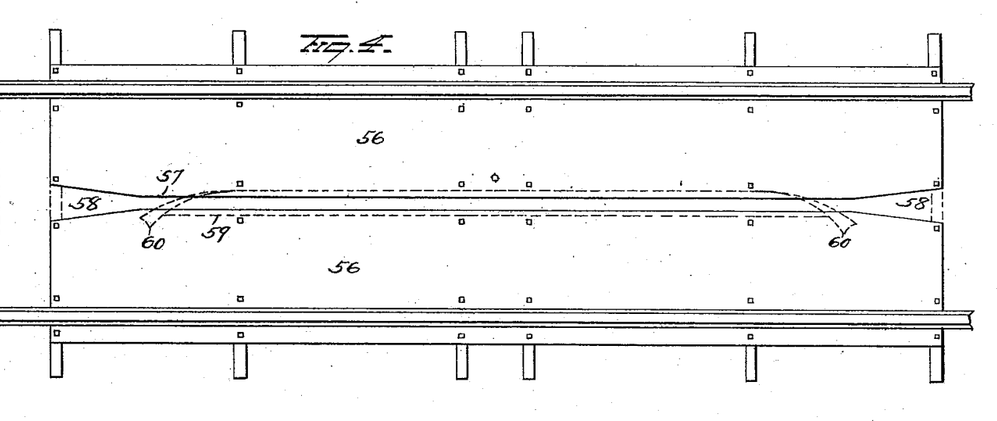
Fig. 4 is a plan view showing the covering devices of the track instrument.

The bell-crank 28 is connected by means of a rod 34 with the arm 35 of a manually operated switch stand 36, as shown in Fig. 1, so that the trainman can, by operating said switch stand transmit motion through the bell-crank 28 and its coöperation with the wheel 16 to the switch rails for throwing the same.

Figure 10:
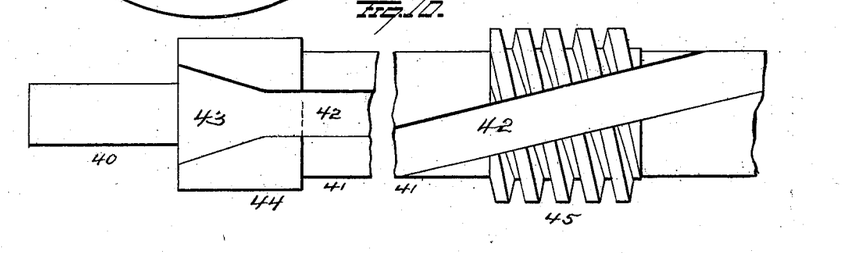
Fig. 10 is an enlarged view showing the roller and worm of the track instrument.
Figure 11:
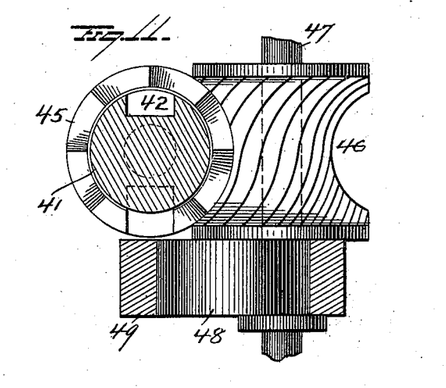
Fig. 11 is an enlarged detail view showing the worm gearing of the track instrument.

In Fig. 1 of the drawing we have shown four track instruments two of which are spaced apart in advance of the switch; one in the main track behind the switch and one in the siding behind the switch. These track instruments are all of the same construction and hence a specific description of one will suffice for the others. At the place where it is desired to locate a track instrument, a suitable bed plate 37 is located below the plane of the rails and on this bed plate, bearings 38—38 and 39 are secured for the accommodation respectively of journals 40 and the intermediate portion of a roller 41. The bearings above referred to will be provided with suitable means to facilitate lubricating the same. The roller 41 is provided with a groove which, throughout the major portion of its length, is made spiral as at 42,—the end portions of the groove being made straight, as at 42ª and these straight portions are made with flaring mouth-portions 43, both of which are normally located on the top side of the roller. The roller 41 may be braced or stiffened at its ends by means of collars 44 in which the flaring mouth-portions 43 of the groove are made. The roller 41 is provided intermediate of its ends with a worm 45 through which the spiral groove 42 extends as clearly shown in Fig. 10. This worm meshes with a worm wheel 46 mounted on a shaft 47 which rises from the base frame 37. A cam or eccentric 48 is rotatable with the worm wheel 46 and receives a strap 49 connected by means of a rod 50 with one end of a longitudinally movable bar 51, the latter being mounted in a suitable bearing 52 on the base frame 37. The other end of the bar 51 is connected, through the medium of a turn-buckle 53, with a bell-crank-lever 54 pivotally supported by the base frame. The other arm of the bell crank 54 has connected thereto one end of a rod 55, the other end of said rod being pivotally attached to the short arm of one of the bell-cranks adjacent to the wheel 16. Assuming that the track instrument is the one located nearest the entrance of the switch, the rod 55 will be connected with the bell-crank 29. It is apparent that when the roller 41 is turned, motion will be imparted through the worm gearing 45—46 and the cam or eccentric 48 to the longitudinally movable bar 51 and from the latter through the turn-buckle 53 and the bell-crank 54 to the rod 55 and thence to the bell-crank 29,—by means of which latter the wheel 16 will be operated to supply motion for throwing the switch as before explained.

The track instrument above described will be located beneath plates 56 disposed between track rails and secured in place by means of suitable fastening devices which may enter the bearings 38 or other projections on the bed frame or plate 37. The plates 56 will be so disposed as to form an elongated slot 57 directly over the roller 41 and having its respective ends enlarged as shown at 58,—said enlarged portions of the slot 57 being disposed immediately in advance of the flaring end portions 43 of the groove 42 in roller 41. The slot 57 formed by the plates 56 is normally covered to protect the underlying track instrument from dirt, etc., by means of an apron 59 hinged at one edge to one of the plates 56. The roller 41 is operable by means of a device carried by the car or locomotive and adapted to pass through the groove 42 for rotating said roller. The ends of this groove are made flaring as before stated, to facilitate the entrance of said device, and in order that the apron 59 (which may consist of a steel plate) shall be automatically raised to permit the device on the car to enter the groove of the roller 41, the ends of said apron are bent or curled upwardly so as to form beveled flanges 60 to be engaged by the device on the car.

The operating device above referred to and carried by the car, may consist of a vertically movable bar 61 having its upper portion made angular, round or elliptical in cross-section and movable through suitable guide-bars 62 secured to the truck or other portion of the car structure. The lower portion of this bar is made cylindrical in form and preferably of two different diameters. Upon the larger portion of the cylindrical end of the bar 61, a sleeve 63 is revolubly mounted to facilitate the proper operation of the apron 59 and on the smaller end of the bar 61, a sleeve or roller 64 is revolubly mounted. This sleeve or roller may be held in place by means of a plate 65 secured to the lower extremity of the bar and the sleeve or roller 64 may serve to prevent longitudinal displacement of the larger sleeve 63.

In order that the trainman may control the operation of the switch mechanism, it is necessary that provision shall be made to raise and lower the bar 61 to cause it to operate the track instrument or not as the case may require. For this purpose a hand lever 66 is mounted at a suitable place on the car and its short arm is connected through the medium of a rod 67, bell-crank 68 and a rod 69 to a bell-crank 70, one arm of which latter is connected with said bar 61. In order that the bar 61 shall be retained in the position to which it may be moved by the operator, a segment 71 may be provided to be engaged by a suitable dog carried by the operating lever 66.

We have hereinbefore described the manner in which the track instrument located nearest the entrance end of the switch is connected with the bell-crank 29 to operate the wheel 16. The track instrument located farthest from the entrance end of the switch is connected by means of a rod 72 with a bell-crank 73 and the latter is connected by means of a rod 74 with another bell-crank 75. The bell-crank 75 is connected by means of a rod 76 to one arm of a bell-crank 77, the other arm of said bell-crank 77 being connected with the rod 34 which operates the bell-crank 28 to move the wheel 16.

The track instrument between the main rails and behind the switch is connected by means of a rod 78 with one arm of a bell-crank 79 and the other arm of this bell-crank is connected by a rod 80 with the bell-crank 31 which operates the wheel 16. The track instrument located in the siding is connected by a rod 81 with one arm of a bell-crank 82 and the other arm of this bell-crank is connected by means of a rod 83 with the bell-crank 30 which operates the wheel 16.

With the construction and arrangement of devices shown and described the engineer or motorman can cause the switch to be opened or closed in front of his train or car as occasion may require and he can also cause the switch behind him to be thrown after he has passed the switch either on the main track or on the siding,—or the switch can be thrown manually from the switch stand as previously explained.

Figure 21:
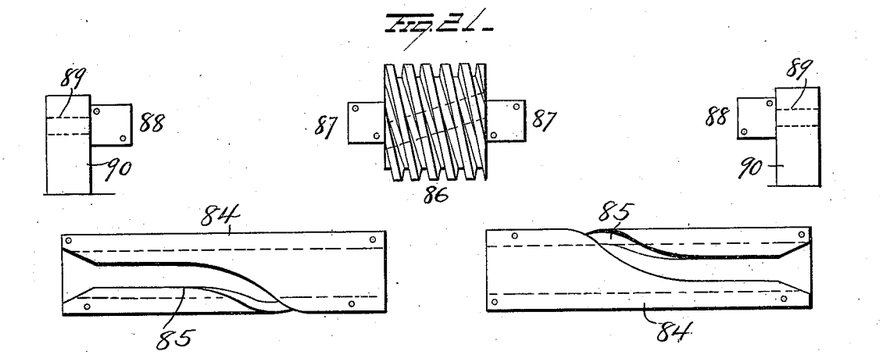
Fig. 21 illustrates a modification (with the parts disassembled) of the roller and worm of the track instrument.

Instead of constructing the roller 41 of the track instrument from a solid grooved shaft,—the said roller may be made tubular and sectional as shown in Fig. 21 and the respective sections provided with slots which aline with a groove in the intermediate worm. In the construction shown in Fig. 21 the roller comprises two tubular members 84 having straight and spiral slots 85 and between these tubular members a worm 86 is disposed and provided with lugs 87 which enter the respective tubular members and are secured thereto. The worm 86, is, as above stated provided with a groove and this groove alines with the slots in the respective roller members and thus a straight and spiral way is formed from one end to the other of the roller for the reception of the bar or shoe 61 carried by the car. The outer ends of the respective roller sections 84 have secured thereto by means of lugs 88, journals 89 mounted in suitable bearings 90.

Figure 5:
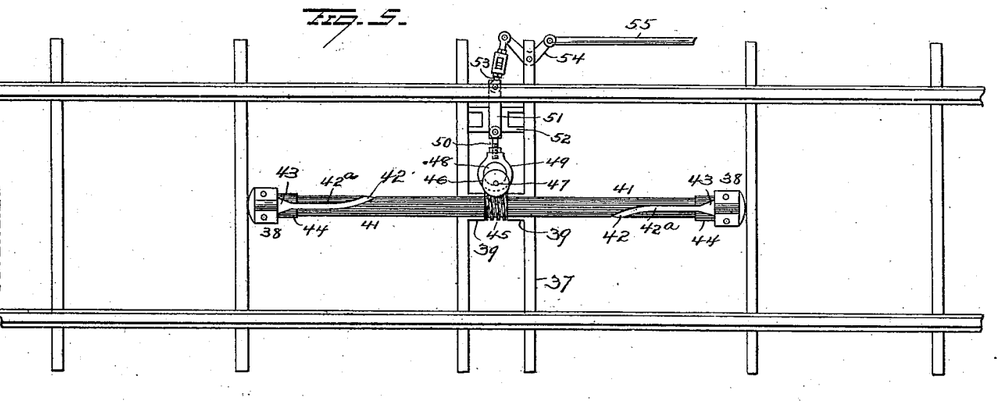
Fig. 5 is an enlarged plan view of the track instrument.
Figures 6, 7:
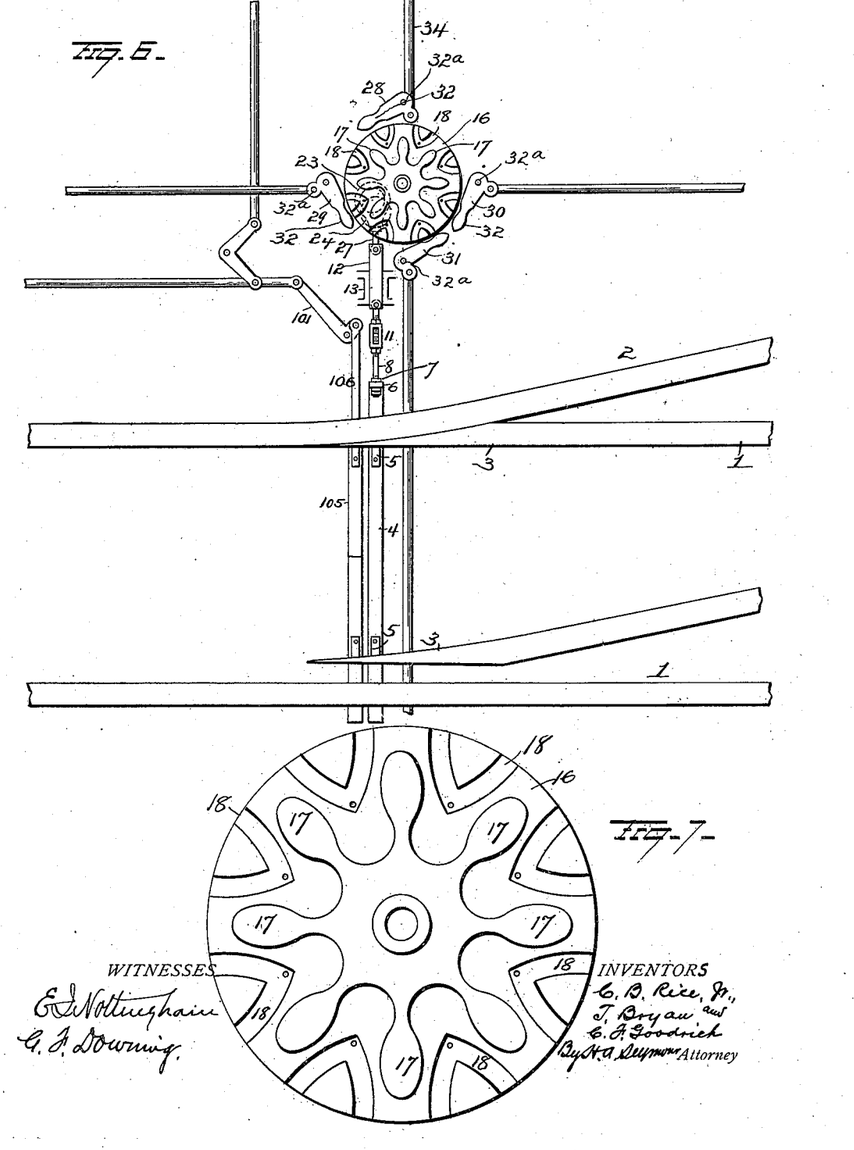
Fig. 6 is an enlarged plan view showing the devices which are operated by the operation of the track instrument for throwing the pivoted switch rails and for operating signaling devices connected with said switch rails.
Fig. 7 is a plan view showing the wheel of the switch operating devices.
Figure 22:
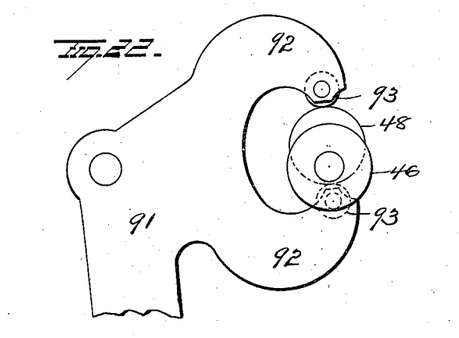
Figs. 22 and 23 are views illustrating modified constructions of bell-cranks.
Figure 23:
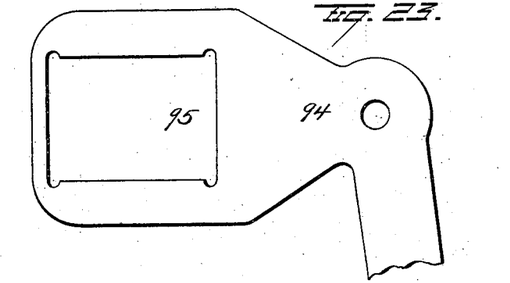

It may in some instances be desired to connect one of the rods between the track devices and the switch throwing devices, more directly with the cam or eccentric 46 of the track instrument than is shown in Fig. 5 of the drawing. For this purpose we may employ a bell-crank 91 pivotally supported upon the base frame 37 in proximity to the roller 41 and having one of its arms connected directly to one of the rods (as 55) leading to the switch throwing mechanism. The other arm of the bell-crank 91 is provided with two members 92 carrying rollers 93 which are disposed diametrically opposite each other and engage the cam or eccentric 46 so that when the latter is rotated, said bell-crank will be moved on its pivotal support and thus motion will be transmitted to the switch throwing mechanism. Instead of constructing the bell-crank 91 as shown in Fig. 22, we may employ a bell-crank 94, Fig. 23,—one arm of this bell-crank being provided with an opening 95 to receive the cam or eccentric 46.

In order that the engineer or motorman may be advised of the condition of the switch, we employ a series of signals as will now be explained: These signals may be of any preferred construction, having signal blades and also signal lights and as their specific construction is not vital to the accomplishment of the purposes of our invention, we have shown them only diagrammatically in Fig. 1. A signal 96 having two blades is located between the main tracks and the siding behind the switch. This signal is connected through the medium of a series of rods 97 and interposed bell-cranks 98 with a bell-crank 99, which latter is connected by means of a rod 100 with a bell-crank 101. The rod 100 also connects the bell-crank 101 with a signal 102 located in advance of the switch and the signal 102 is connected by a rod 103 with a signal 104 located between the two track instruments in advance of the switch. The switch points are connected by means of a bar 105 and this bar is connected by means of a rod 106 with the short arm of the bell-crank 101. In order that the distance between the switch points and the stock rails shall be properly regulated the bar 105 is made in two parts or sections as shown at 107, Fig. 16 so that they can have a movement with relation to each other. Each member 107 of the bar 105 is provided with a lug 108. The lugs of the respective bar sections are made with openings for the free passage of a sleeve 109 on a screw 110, said screw being provided at the ends of the sleeve 109 with nuts 111—112 which serve to hold the sleeve in place and limit the movements of the bar sections with relation to each other.

With the construction and arrangement of signals above described, it will be seen that when the switch points are thrown from one position to the other, all of the signals will be shifted and will indicate to the engineer or motorman on a car moving in either direction on the main track or on the siding, the exact condition of the switch so that if the latter is not properly thrown for his car or train, he can effect the proper shifting of the switch before reaching the same.

The switch rail operating mechanism will preferably be inclosed within a box provided with a suitable movable cover.

Having fully described our invention what we claim as new and desire to secure by Letters-Patent, is:—

1. In railway switch mechanism, the combination with a switch rail and operating mechanism therefor, of a roller having a spiral way, a device to be carried by a car to move through said spiral way and turn the roller, a worm carried by said roller, a worm wheel meshing with said worm, a cam or eccentric rotatable with said worm wheel, connections between said cam or eccentric and the switch operating mechanism, and a hinged apron normally disposed over said roller and having flanged ends to be engaged by the device carried by the car for raising said apron.

2. In railway switch mechanism, the combination with a switch rail and operating mechanism therefor, of a roller having a spiral way, a device to be carried by a car and moved through said spiral way for rotating the roller, a worm carried by the roller, a worm wheel meshing with said worm, a cam or eccentric rotatable with the worm wheel, a strap embracing said cam or eccentric, a bell-crank, connections between said strap and bell-crank, and connections between the bell-crank and the switch operating mechanism.

3. In railway switch mechanism, the combination with the track rails and switch rails, of switch operating mechanism connected with the switch rails, a roller disposed between and parallel with the track rails, said roller having a spiral way, a device to be carried by a car and movable through said way for rotating the roller, plates secured over the roller and spaced apart to form a slot for the device on the car, a hinged apron normally covering said slot and constructed at its ends to be engaged by the device on the car for raising said apron and permitting said device to pass through the way in the roller, and connections between said roller and the switch operating mechanism.

4. In railway switch mechanism, the combination with track-rails, pivoted switch rails and operating mechanism for the switch rails, of a base plate disposed under the track-rails at a distance from the switch rails, bearings on said base plate, a roller having a spiral way and provided at its ends with journals mounted in said bearings, a worm between the ends of said roller, a worm wheel mounted adjacent to said worm and meshing therewith, a cam or eccentric rotatable with said worm wheel, connections between said cam or eccentric and the switch operating mechanism, plates above the roller and secured to the bearings on the base plate, said plates above the roller being spaced apart to form a slot immediately over the roller, a hinged apron normally covering said slot and provided at its ends with beveled flanges and a device to be carried by a car to engage the beveled flanges on the apron for raising the latter and adapted to pass through the spiral way in the roller for rotating the latter.

5. In railway switch mechanism, the combination with track rails, switch rails and operating mechanism for the switch rails, of a roller mounted in advance of the switch rails and between the track rails and provided with a spiral way, a worm between the ends of said roller, a worm wheel meshing with said worm, a cam or eccentric rotatable with said worm wheel, a strap embracing said cam or eccentric, a longitudinally movable bar connected with said strap, a bell-crank, an adjustable connection between one arm of said bell-crank and said longitudinally movable bar, and connections between said bell-crank and the switch operating mechanism.

6. In switch operating mechanism, the combination with track rails, switch rails and operating mechanism for the switch rails, of a roller having a straight and spiral way and mounted between the track rails at a distance from the switch rails, plates forming a slot over said roller, an apron normally closing said slot and hinged at one side thereof, said apron provided at its ends with beveled flanges, connections between said roller and the switch operating mechanism, and a vertically movable bar to be carried by a car and provided at its lower portion with superposed sleeves or rollers to operate said apron and roller respectively.

7. In railway switch mechanism, the combination with pivoted switch rails, of a wheel mounted adjacent to said rails and provided on one face with an annular series of fingers, connections between said wheel and the switch rails, a series of bell-cranks adjacent to said wheel and each terminating at one end in a finger to engage the fingers of the wheel for moving the latter to throw the switch, and means for operating said bell-crank.

8. In railway switch mechanism, the combination with pivoted switch rails, of a wheel in proximity thereto, connections between said wheel and the switch rails, a series of bell-cranks in proximity to said wheel and each terminating at one end in a finger, an annular series of fingers on one face of said wheel to be engaged by the fingers of said bell-cranks for moving said wheel, means for stopping the movement of said wheel, and means for operating said bell-cranks.

9. In railway switch mechanism, the combination with pivoted switch rails, of a wheel adjacent thereto and provided with an annular series of V-shaped grooves, an annular series of fingers on said wheel alternating with and in a plane above said V-shaped grooves, connections between said wheel and the switch rails, a series of bell-cranks, each having a finger to coöperate with the fingers on the wheel for turning the latter, a pin on each bell-crank to enter one of the V-shape grooves in the wheel and control the limit of the rotation of the latter, and means for operating said bell-crank.

10. In railway switch mechanism, the combination with switch rails, of a wheel in proximity thereto, a gear carried by said wheel, a pinion meshing with said gear, a cam or eccentric rotatable with the pinion, connections between said cam or eccentric and the switch rails, track instruments, operating devices for said wheel, and means connecting the track instruments with said operating devices to actuate said wheel to throw the switch rails.

11. In railway switch mechanism, the combination with switch rails, of a wheel in proximity thereto and provided with an internally toothed gear and with an annular groove in its under face, a vertical shaft having its upper end loosely disposed in said annular groove, a pinion on said shaft and meshing with the internally toothed gear on the wheel, a cam or eccentric rotatable with said pinion, connections between said cam or eccentric and the switch rails, and means for turning said wheel.

12. In railway switch mechanism, the combination with pivoted switch rails, of a wheel in proximity thereto, a cam or eccentric, means for transmitting motion from said wheel to the cam or eccentric, a strap on said cam or eccentric, a longitudinally movable bar connected with said strap, an adjustable rod attached to the other end of said bar, a bar connecting the switch rails, a sliding connection between said last mentioned bar and the adjustable rod, and means for turning said wheel.

13. In railway switch mechanism, the combination with track rails and switch rails, of a wheel provided with an annular series of V-shaped grooves, an annular series of fingers on said wheel and alternating with the V-shaped grooves, means for transmitting motion from said wheel to the switch rails, a series of bell-cranks mounted adjacent to said wheels and provided with fingers to engage the fingers on the wheel for turning the latter, pins on said bell-cranks to enter the V-shaped grooves and limit the rotation of the wheel, track instruments connected with said bell-cranks, a device to be carried by a car for operating said track instruments to move said wheel and throw the switch, and means for manually operating one of said bell-cranks to throw the switch through the medium of said wheel.

14. In railway switch mechanism, the combination with a switch rail and operating mechanism therefor, of a roller provided with a spiral way having flaring entrance portions at the ends of the roller, and reinforcing bands encircling the end portions of said roller, a device carried by a car to move through the spiral way in the roller and rotate the latter, and means for conveying motion from said roller to the switch rail operating mechanism.

In testimony whereof, we have signed this specification in the presence of two subscribing witnesses.

CHRISTOPHER B. RICE, Jr.
THOMAS BRYAN.
C. F. GOODRICH.

Witnesses:
F. C. GOODRICH;
P. J. GOODRICH.